(12) United States Patent
Guen (10) Patent No.: US 9,318,736 B2
(45) Date of Patent: Apr. 19, 2016

(54) SECONDARY BATTERY (71) Applicant: Samsung SDI Co., Ltd., Yongin-si, Gyeonggi-do (KR)

(72) Inventor: Min-Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 176 days.

(21) Appl. No.: 13/949,157

(22) Filed: Jul. 23, 2013

(65) Prior Publication Data

US 2014/0255735 A1    Sep. 11, 2014

(30) Foreign Application Priority Data

Mar. 6, 2013 (KR) ........................ 10-2013-0023943

(51) Int. Cl.
*H01M 2/34* (2006.01)
*H01M 2/26* (2006.01)

(52) U.S. Cl.
CPC ............... *H01M 2/348* (2013.01); *H01M 2/26* (2013.01); *H01M 2200/103* (2013.01)

(58) Field of Classification Search
CPC .. H01M 2/348; H01M 2/26; H01M 2200/103
See application file for complete search history.

(56) References Cited

U.S. PATENT DOCUMENTS

2011/0081560 A1    4/2011  Kim et al.
2011/0183165 A1*   7/2011  Byun et al. ............... 429/61
2011/0244281 A1*  10/2011  Byun ......................... 429/62

FOREIGN PATENT DOCUMENTS

KR    10-2011-0036381 A    4/2011
KR       10-1036070 B1    5/2011
KR    10-2012-0002406 A    1/2012

* cited by examiner

*Primary Examiner* — Brittany Raymond
(74) *Attorney, Agent, or Firm* — Lewis Roca Rothgerber Christie LLP (57) ABSTRACT

A secondary battery includes an electrode assembly; a cap plate and a case accommodating the electrode assembly; an electrode terminal protruding above the cap plate; a current collecting member that electrically connects the electrode assembly to the electrode terminal; and a fuse unit on the current collecting member and configured to block a current beyond a preset blocking point, wherein the fuse unit includes a fracture unit surrounding a through hole in the current collecting member; and a blocking point control unit formed as a notch on the fracture unit.

18 Claims, 11 Drawing Sheets

SECONDARY BATTERY

CROSS-REFERENCE TO RELATED APPLICATION

This application claims priority to and the benefit of Korean Patent Application No. 10-2013-0023943, filed on Mar. 6, 2013, in the Korean Intellectual Property Office, the disclosure of which is incorporated herein in its entirety by reference.

BACKGROUND

1. Field

One or more embodiments of the present invention relate to a secondary battery.

2. Description of the Related Art

Generally, unlike a primary battery that is not rechargeable, a secondary battery is a rechargeable and dischargeable battery. Secondary batteries are typically used as an energy source of mobile equipment, electrical vehicles, hybrid vehicles, electrical bicycles, and uninterruptible power supplies. Depending on the type of external equipment to which the secondary battery is applied, the secondary battery is used in a single cell type or in a cell module in which a plurality of cells are bound to a single unit by electrically connecting the cells.

However, when an excessive current is charged or discharged in the secondary battery, high heat may be generated or an electrolyte may be decomposed. In this case, an internal pressure may be increased, and as a result, the secondary battery may ignite or explode. Therefore, there is a need to develop a structure of a secondary battery that can perform a safety operation in advance by sensing an abnormal situation, such as an overcurrent.

SUMMARY

One or more embodiments of the present invention include a secondary battery that ensures a high reliability of current blocking at a designed overcurrent blocking point and precisely controls the point at which a current flow is blocked.

One or more embodiments of the present invention include a secondary battery that provides a safety structure as described above and can minimize the reduction of structural strength that can occur due to the safety structure. Additional aspects will be set forth in part in the description which follows and, in part, will be apparent from the description.

According to one or more embodiments of the present invention, there is provided a secondary battery including: an electrode assembly; a cap plate disposed on the electrode assembly; an electrode terminal protruding above the cap plate; a current collecting member that electrically connects the electrode assembly to the electrode terminal; and a fuse unit that is formed on the current collecting member to block a current beyond a preset blocking point, wherein the fuse unit includes: a fracture unit formed to surround a through hole formed in the current collecting member; and a blocking point control unit formed in a notch shape on the fracture unit.

The through hole may have a slim shape that extends long in a direction perpendicular to the extending direction of the current collecting member.

The blocking point control unit may be formed on an external surface of the fracture unit that is on an opposite side to the through hole.

The blocking point control unit may be formed in a region that is projected in a length direction of the through hole of the external surface of the fracture unit.

The blocking point control unit may be formed in a concave shape from the external surface of the fracture unit towards the through hole.

The blocking point control unit may be formed in a pair on both side surfaces of the fracture unit that are opposite to each other with the through hole therebetween.

The blocking point control unit may be formed outside a region of the external surface of the fracture unit outside the region that is projected in a length direction of the through hole.

The blocking point control units may be formed in plural numbers along the external surface of the fracture unit, wherein some portions of the blocking point control units are formed in the region of the fracture unit that is projected in a length direction of the through hole, and the other portions of the blocking point control units are formed outside the region of the fracture unit that is projected in a length direction of the through hole.

The blocking point control unit may be formed on an inner surface of the fracture unit facing the through hole.

The blocking point control unit may form a single opening together with the through hole by being connected to the through hole.

The blocking point control unit may be formed in a pair on both side surfaces of the fracture unit facing the through hole.

The blocking point control unit is formed inside a region of an inner surface of the fracture unit that is projected in a length direction of the through hole.

The blocking point control unit may include a first control unit formed on an external surface of the fracture unit that is opposite to the through hole and a second control unit formed on an inner surface of the fracture unit facing the through hole.

The first and second control units may be formed inside a region of the fracture unit that is projected in a length direction of the through hole.

According to one or more embodiments of the present invention, there is provided a secondary battery including: an electrode assembly; a cap plate disposed on the electrode assembly; an electrode terminal protruding above the cap plate; a current collecting member that electrically connects the electrode assembly to the electrode terminal; and a fuse unit that is formed on the current collecting member to block a current beyond a preset blocking point, wherein the fuse unit includes: a fracture unit formed to surround a through hole formed in the current collecting member; and a blocking point control unit formed in a hole shape on the fracture unit.

The through hole may have a slim shape that extends long in a direction perpendicular to the extending direction of the current collecting member.

The blocking point control unit may be separately formed from the through hole.

The blocking point control unit may be formed inside a region of the fracture unit that is projected in a length direction of the through hole.

The blocking point control unit may be formed as a pair on both sides of the fracture unit that are opposite to each other with the through hole therebetween.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings.

Figure 1:
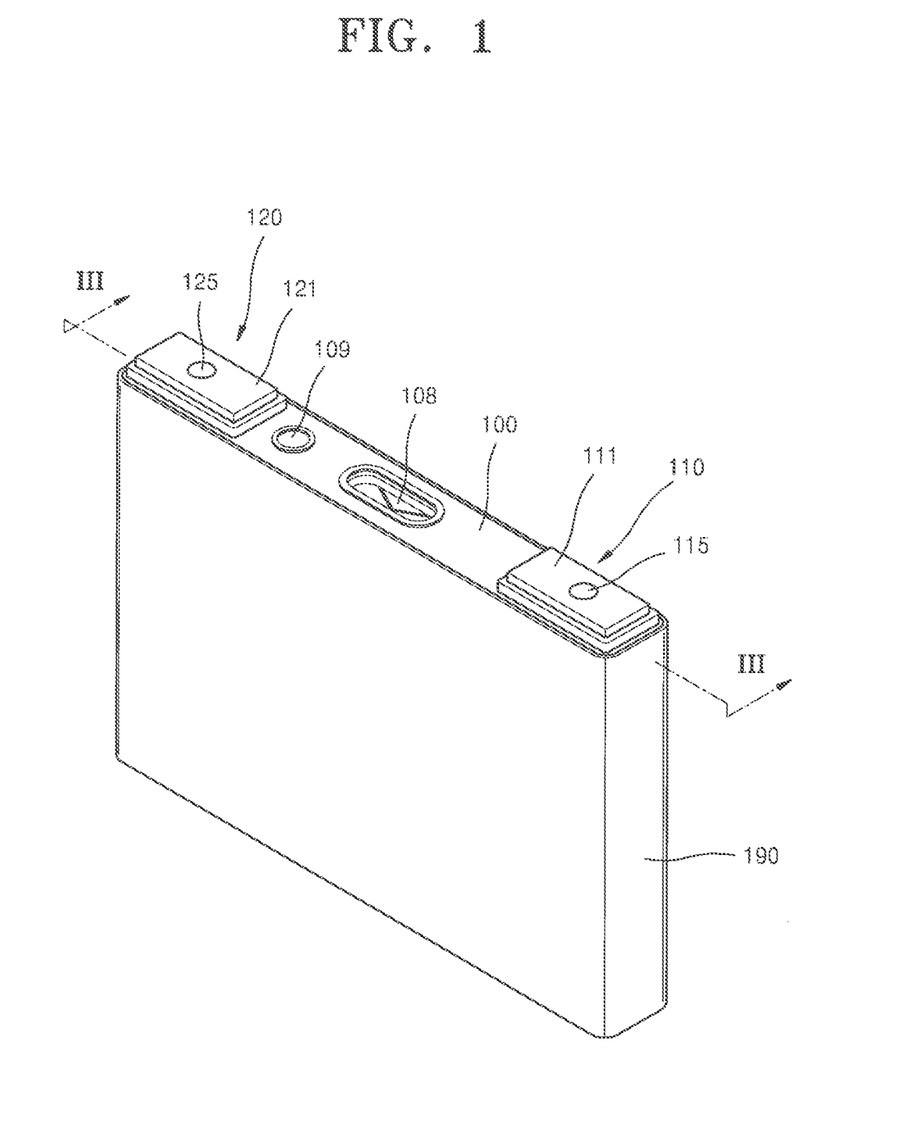
FIG. 1 is a perspective view of a secondary battery according to an embodiment of the present invention.
Figure 2:
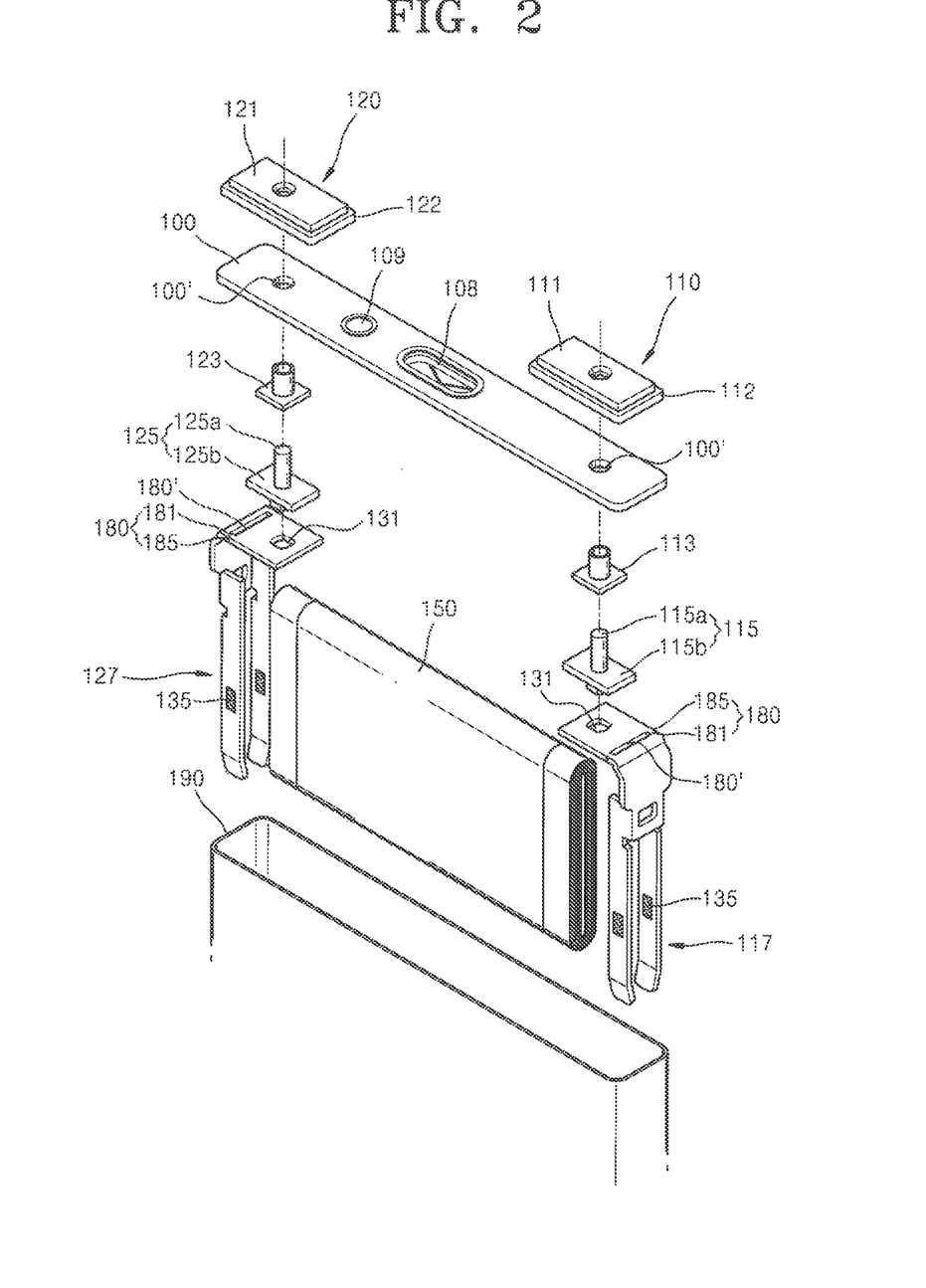
FIG. 2 is an exploded perspective view of the secondary battery of FIG. 1.

FIG. 1 is a perspective view of a secondary battery according to an embodiment of the present invention. FIG. 2 is an exploded perspective view of the secondary battery of FIG. 1.

Referring to FIGS. 1 and 2, the secondary battery includes a case 190 that accommodates an electrode assembly 150 therein, and a cap plate 100 that closes the case 190 in which the electrode assembly 150 is accommodated. For example, the cap plate 100 may be combined on the case 190, and a welding unit may be formed along edges where the cap plate 100 and the case 190 contact each other to seal the cap plate to the case. The welding unit may be formed by a laser welding between the cap plate 100 and the case 190.

A pair of electrode terminals, for example, first and second electrode terminals 110 and 120 having polarities opposite to each other may be formed on the cap plate 100. In one embodiment, the first and second electrode terminals 110 and 120 are electrically connected to the electrode assembly 150 that is accommodated in the secondary battery. The first and second electrode terminals 110 and 120 respectively may function as a positive terminal and a negative terminal for supplying discharging power stored in the secondary battery to the outside or for receiving charging power from the outside by being electrically connected to the electrode assembly 150. For example, the first and second electrode terminals 110 and 120 may be formed on both sides of the secondary battery.

In the current embodiment, the cap plate 100 may function as a terminal by being electrically connected to the electrode assembly 150. However, in other embodiments, one of the first and second electrode terminals 110 and 120 may be omitted.

In FIG. 1, the cap plate 100 may include a safety vent 108. The safety vent 108 may be formed relatively weaker than other portions of the cap plate 100. When an internal pressure is greater than a predetermined level, the internal pressure may be released by fracturing the safety vent 108. The cap plate 100 also includes a sealing member 109. After injecting an electrolyte into the case 190 through an electrolyte injection hole, the sealing member 109 seals the electrolyte injection hole by being assembled in the electrolyte injection hole.

Figure 3:
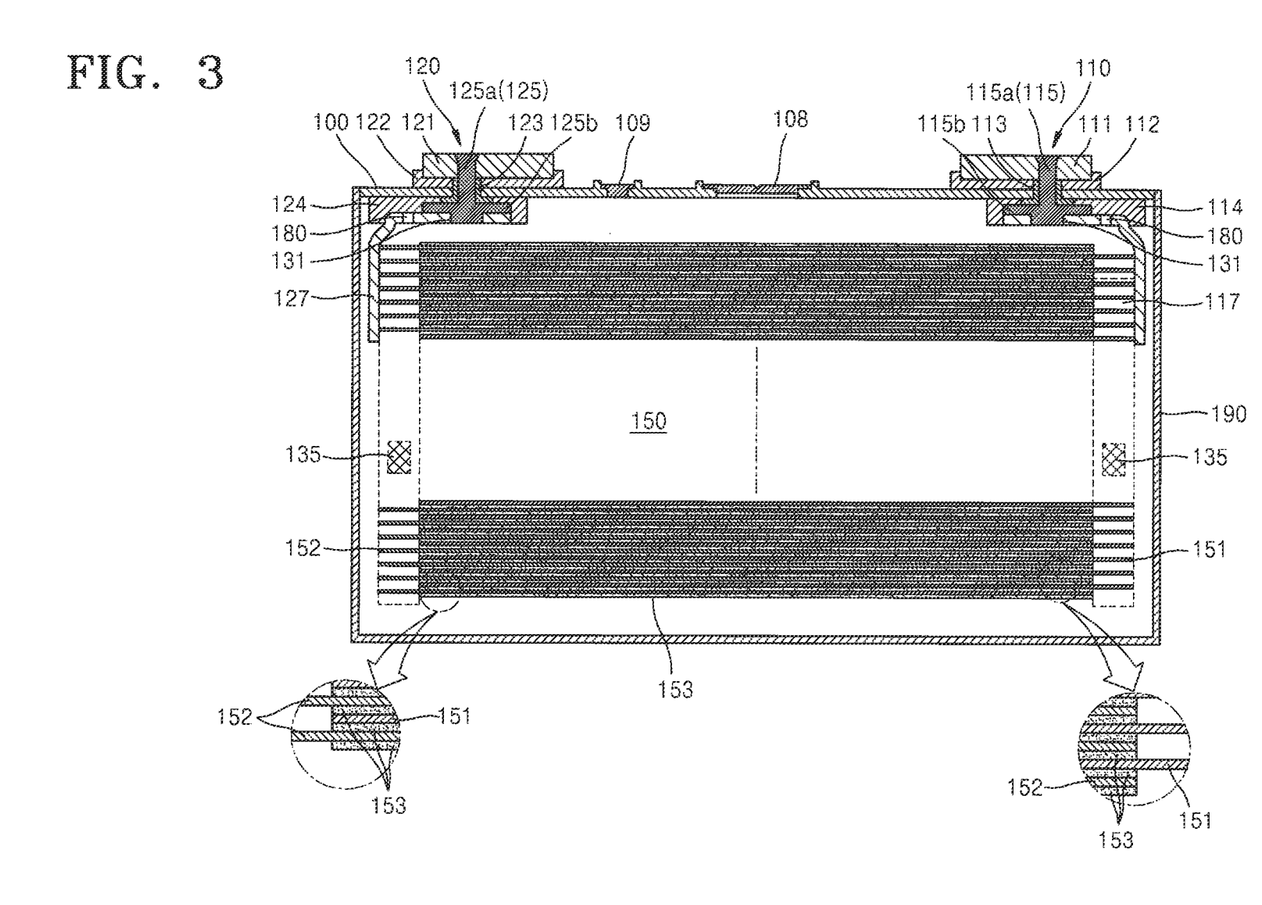
FIG. 3 is a cross-sectional view taken along line III-III of FIG. 1.

FIG. 3 is a cross-sectional view taken along line III-III of FIG. 1.

Referring to FIGS. 2 and 3, the secondary battery includes the electrode assembly 150, the first and second electrode terminals 110 and 120, and current collecting members 117 and 127 that intermediate the electrical connections of the electrode assembly 150 and the first and second electrode terminals 110 and 120. Also, the secondary battery may include the case 190 that accommodates the electrode assembly 150 and the cap plate 100 that seals an opening of the case 190 in which the electrode assembly 150 is accommodated.

The electrode assembly 150 may be accommodated in the case 190 of the secondary battery, and may include first and second electrode plates 151 and 152 having polarities opposite to each other and a separator 153 located therebetween. The electrode assembly 150 may be formed in a stack form in which the first and second electrode plates 151 and 152 and the separator 153 are alternately stacked.

The cap plate 100 may be assembled on an upper opening of the case 190 that accommodates the electrode assembly 150 to seal the electrode assembly 150. In order to make an electrical connection between the electrode assembly 150 and an external circuit or between the electrode assembly 150 and a neighboring secondary battery, the first and second electrode terminals 110 and 120 that are electrically connected to the electrode assembly 150 are formed outside the cap plate 100. The electrode terminals may have first and second electrode terminals 110 and 120 having different polarities and that may be respectively electrically connected to the first and second electrode plates 151 and 152.

The first electrode terminal 110 may include a first current collecting terminal 115 and a first terminal plate 111 connected to the first current collecting terminal 115. Likewise, the second electrode terminal 120 may include a second current collecting terminal 125 and a second terminal plate 121 connected to the second current collecting terminal 125.

The first and second current collecting terminals 115 and 125 may protrude outside of the cap plate 100 through the cap plate 100. For this purpose, terminal holes 100' into which the first and second current collecting terminals 115 and 125 are inserted may be formed in the cap plate 100. More specifically, the first and second current collecting terminals 115 and 125 are upwardly inserted from a lower side of the cap plate 100 through the terminal holes 100' of the cap plate 100.

The first and second current collecting terminals 115 and 125 may be inserted into the terminal holes 100' and electrically insulated from the cap plate 100. For example, seal gaskets 113 and 123 may be inserted into the terminal holes 100'. Since the first and second current collecting terminals 115 and 125 are inserted into the terminal holes 100' along with the seal gaskets 113 and 123, the first and second current collecting terminals 115 and 125 may be insulated from the cap plate 100. The seal gaskets 113 and 123 seal around the terminal holes 100', and thus, leaking of an electrolyte accommodated in the case 190 may be prevented and penetration of external impurities into the case 190 is blocked.

The first and second current collecting terminals 115 and 125 may be electrically connected to the electrode assembly 150 through the current collecting members 117 and 127. The current collecting members 117 and 127 mutually electrically connect between the electrode assembly 150 and the first and second current collecting terminals 115 and 125. The current collecting members 117 and 127 may include electrode assembly combining units 135 that combine with the electrode assembly 150 at a lower side of the current collecting members 117 and 127, current collecting terminal combining units 131 that combine with the first and second current collecting terminals 115 and 125 on an upper side of the current collecting members 117 and 127, and fuse units 180 formed between the electrode assembly combining units 135 and the current collecting terminal combining units 131 along a length direction of the current collecting members 117 and 127.

The electrode assembly combining units 135 may be combined with both edges of the electrode assembly 150. More specifically, the electrode assembly combining units 135 may be combined with the electrode assembly 150 by welding on active-material-non-coated portions formed on the edges of the electrode assembly 150, that is, the active-material-non-coated portions on which an electrode active material is omitted on the first and second electrode plates 151 and 152. For example, the electrode assembly combining units 135 of the current collecting members 117 and 127 respectively may be combined with the active-material-non-coated portions of the first and second electrode plates 151 and 152.

The current collecting terminal combining units 131 extend in a direction bending from the electrode assembly combining units 135 and may be formed on the current collecting members 117 and 127 that face the first and second current collecting terminals 115 and 125. The current collecting terminal combining units 131 may include holes for combining with the first and second current collecting terminals 115 and 125. For example, lower sides of the first and second current collecting terminals 115 and 125 are inserted into the holes of the current collecting terminal combining units 131, and thus, the first and second current collecting terminals 115 and 125 and the current collecting terminal combining units 131 may be assembled facing each other. Then, the first and second current collecting terminals 115 and 125 and the current collecting terminal combining units 131 may be combined with each other by welding along a circumference where the first and second current collecting terminals 115 and 125 and the current collecting terminal combining units 131 contact each other.

The fuse units 180 may be formed between the electrode assembly combining units 135 and the current collecting terminal combining units 131, and may form a charging and discharging current path between the electrode assembly 150 and the first and second current collecting terminals 115 and 125. The fuse units 180 forcedly block the charging and discharging current path when an overcurrent greater than a set blocking point flows. For example, the fuse units 180 perform a safety operation for preventing a safety accident such as explosion or fire ignition of the secondary battery due to an overcurrent by forcedly blocking the charging and discharging current path during the occurrence of an abnormal circumstance.

For example, the charging and discharging current path through the fuse units 180 may be blocked by melting due to resistance heat, and a blocking point may be established according to a heating value determined by an electrical resistance and current of the fuse units 180. For example, in the current collecting members 117 and 127 that are formed of a uniform material, the fuse units 180 may be formed with a minimum cross-sectional area along a length of the current collecting members 117 and 127 and may be designed to have an electrical resistance corresponding to the blocking point.

Figure 4:
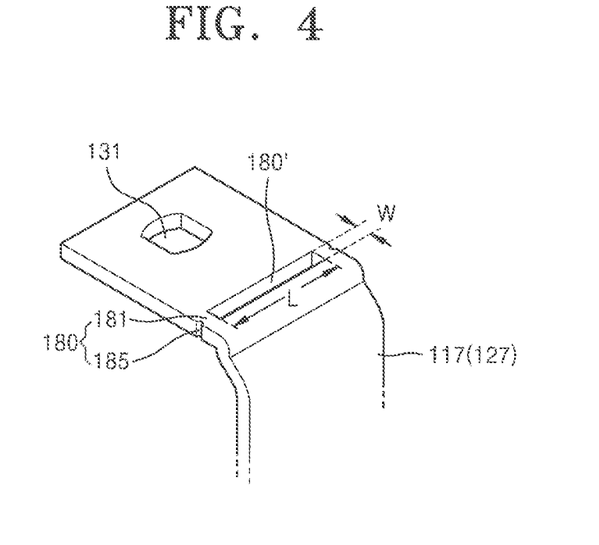
FIG. 4 is a perspective view of a fuse unit that is applied to the secondary battery according to an embodiment of the present invention.
Figure 5:
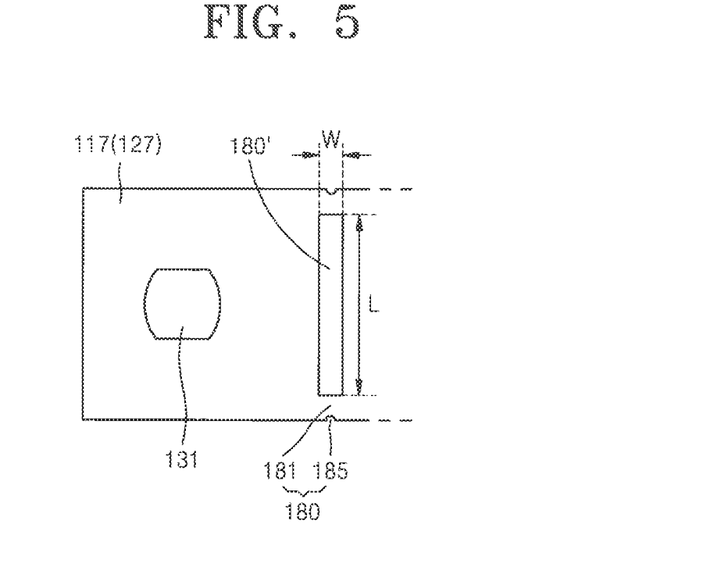
FIG. 5 is a plan view of a planar structure of the fuse unit of FIG. 4.

FIG. 4 is a perspective view of the fuse unit 180 that is applied to the secondary battery according to an embodiment of the present invention. FIG. 5 is a plan view of a planar structure of the fuse unit 180 of FIG. 4.

Referring to FIGS. 4 and 5, the fuse unit 180 may include a fracture unit 181 formed around a through hole 180' and a blocking point control unit 185 formed on the fracture unit 181. For example, the fracture unit 181 may be formed in a shape surrounding the through hole 180' formed in the current collecting member 117 (127).

The through hole 180' may be formed in a slim shape in which a length side thereof extends in a direction perpendicular to the extending direction of the current collecting member 117 (127). For example, the current collecting member 117 (127) generally extends in a vertical direction to connect the electrode assembly 150 on a lower side thereof and the first or second current collecting terminal 115 (125) on an upper side thereof. In one embodiment, the through hole 180' extends in a direction perpendicular to the vertical direction and may block a charging and discharging current path that is formed by the current collecting member 117 (127).

For example, the through hole 180' may be formed in a slim shape in which a length L is relatively longer than a width W. For example, the through hole 180' may be formed in a rectangular shape having a length L having a maximum length and a width W having a minimum length. Since the fracture unit 181 is fractured along the length direction of the through hole 180', the charging and discharging current path may be blocked.

The blocking point control unit 185 may be formed on the fracture unit 181. For example, the blocking point control unit 185 may be formed on a location separated from the through hole 180' in the fracture unit 181. For example, the blocking point control unit 185 may be formed on an external surface of the fracture unit 181. More specifically, the blocking point control unit 185 may be formed as a plurality along the external surface of the fracture unit 181, for example, may be formed in pairs on both external surfaces of the fracture unit 181.

The blocking point control unit 185 may be formed in a region W of the external surface of the fracture unit 181 that is projected in a length direction of the through hole 180'. According to the current embodiment, the projected region W may be a region corresponding to the width W of the through hole 180'.

When the through hole 180' is formed in a slim shape in which a length L is longer than a width W, the blocking point control unit 185 is formed in a region W of the fracture unit 181 that is projected in a length direction of the through hole 180'. Thus, the blocking point control unit 185 may induce a fracture of the current collecting members 117 (127) along the length direction of the through hole 180'. As depicted in FIG. 4, the blocking point control unit 185 may be formed in a notch shape, and may have a shape grooved from an external surface of the fracture unit 181 towards the through hole 180'. Also, the blocking point control unit 185 may be formed to have a minute size (i.e., it is significantly smaller) compared with the through hole 180'.

The blocking point control unit 185 ensures current blocking at a designed blocking point. For example, when a safety operation is not started in a circumstance when an overcurrent beyond the blocking point flows, there is a high risk of explosion or fire ignition of the secondary battery. Therefore, there is a need to start a safety operation of the blocking point control unit 185 at a designed blocking point. Since the blocking point control unit 185 forms a discontinuous notch with respect to a charging and discharging current, the blocking point control unit 185 may induce a bottleneck of the charging and discharging current. Accordingly, the current is concentrated at the blocking point control unit 185, and thus, an initiation point for thermal melting is provided.

Also, the blocking point control unit 185 provides a structure for precisely controlling the blocking point of the charging and discharging current path. For example, when a safety operation starts in a circumstance when a normal current below the blocking point flows, a normal charging and discharging operation of the secondary battery may not be performed. Since the fracture unit 181 is formed around the through hole 180' having a relatively large size, the precise control of the blocking point may not be controlled. Also, when the through hole 180' is large, the mechanical strength of the current collecting member 117 (127) may be reduced. Since the blocking point control unit 185 is formed in a size smaller than the fracture unit 181, the blocking point may be precisely controlled, and the reduction of the mechanical strength of the current collecting member 117 (127) may be mitigated to some degree.

Figure 6:
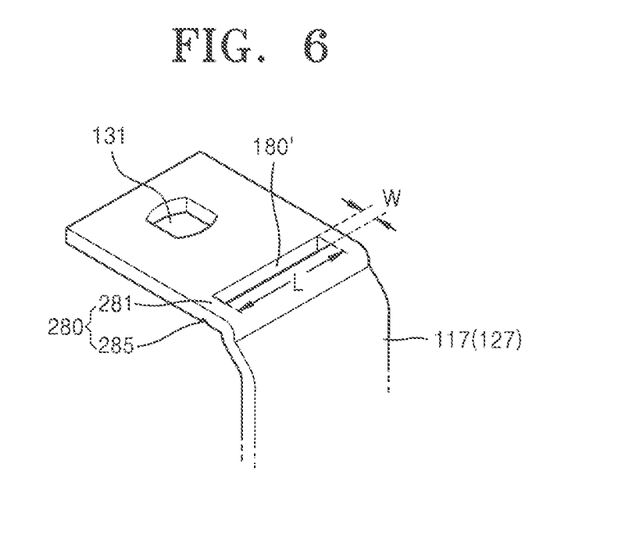
FIG. 6 is a perspective view of a modified version of the fuse unit of FIG. 4.

FIG. 6 is a perspective view of a modified version of the fuse unit 180 of FIG. 4. Referring to FIG. 6, a fuse unit 280 may include a fracture unit 281 formed around the through hole 180' and a blocking point control unit 285 formed on the fracture unit 281. The blocking point control unit 285 is formed in a region W of the fracture unit 281 that is projected in a length direction of the through hole 180', and thus, may induce a fracture of the current collecting member 117(127) along the length direction of the through hole 180'.

The blocking point control unit 285 may be formed in a notch shape, and may have a shape grooved from an external surface of the fracture unit 281 towards the through hole 180'. In FIG. 6, the blocking point control unit 285 may be optionally formed in a portion of a thickness of the current collecting member 117 (127) from a lower surface of the current collecting member 117 (127) without passing through the entire thickness of the current collecting member 117 (127). Since the blocking point control unit 285 provides a structure for precisely controlling the blocking point of the charging and discharging current path, if necessary, the blocking point control unit 285 may be formed in a minute size with respect to a portion of the thickness without passing through the entire thickness of the current collecting member 117 (127).

Figure 7:
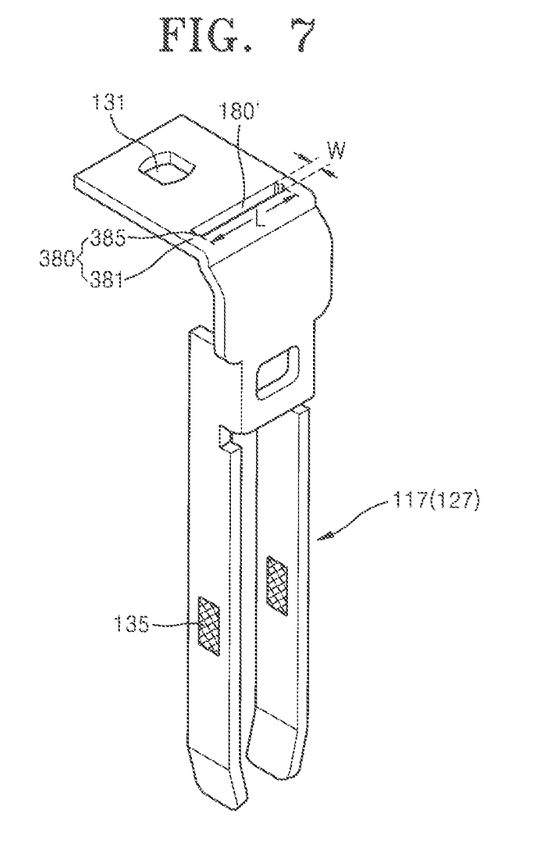
FIG. 7 is a perspective view of a fuse unit that is applied to the secondary battery according to another embodiment of the present invention.
Figure 8:
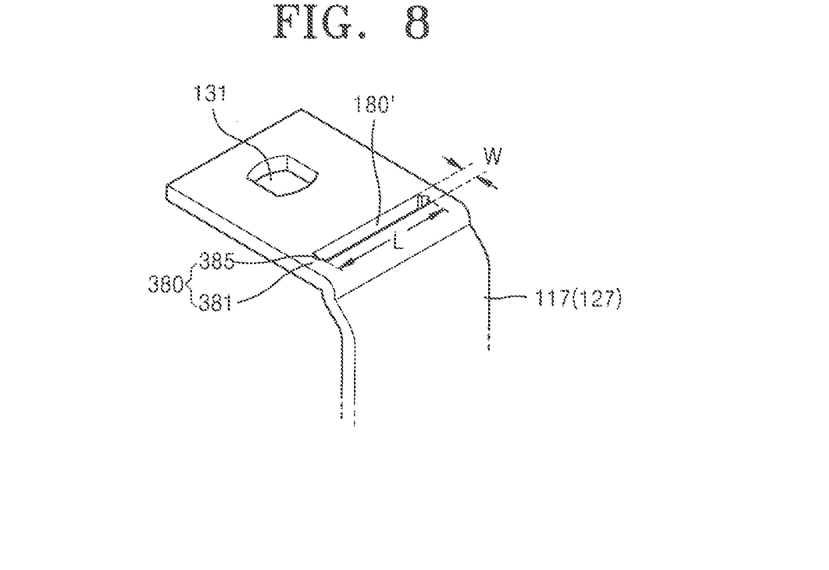
FIG. 8 is a magnified perspective view of the fuse unit of FIG. 7.
Figure 9:
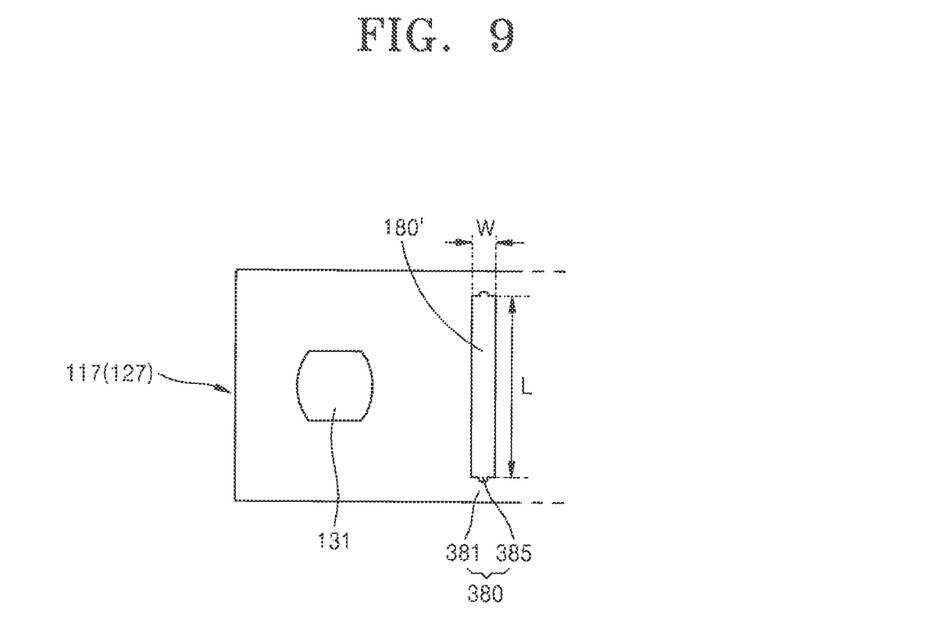
FIG. 9 is a plan view of a planar structure of the fuse unit of FIG. 7.

FIG. 7 is a perspective view of a fuse unit 380 that is applied to the secondary battery according to another embodiment of the present invention. FIG. 8 is a magnified perspective view of the fuse unit 380 of FIG. 7. FIG. 9 is a plan view of a planar structure of the fuse unit 380 of FIG. 7.

Referring to FIGS. 7, 8, and 9, the fuse unit 380 includes a fracture unit 381 formed around the through hole 180' and a blocking point control unit 385 formed on the fracture unit 381. The fracture unit 381 may be formed in a shape surrounding the through hole 180' formed in the current collecting member 117 (127). Also, the blocking point control unit 385 is formed on the fracture unit 381. More specifically, the blocking point control unit 385 is formed on an inner surface of the fracture unit 381, that is, on the inner surface facing the through hole 180'. The blocking point control unit 385 may form an opening together with the through hole 180' by being connected to the through hole 180'. For example, the blocking point control unit 385 is formed in a notch shape connected together with the through hole 180'.

When the through hole 180' is formed in a slim shape, a longitudinal side extends along a length direction of the through hole 180', the blocking point control unit 385 is formed in a region W of the fracture unit 381 that is projected in a length direction of the through hole 180', and thus, the fracture of the current collecting member 117 (127) along the length direction of the through hole 180' may be induced. In FIGS. 7, 8, and 9, the blocking point control unit 385 may be a region corresponding to a width W of the through hole 180'. For example, the blocking point control unit 385 may be formed in a notch shape at an edge of the through hole 180', and may be formed in a minute size, compared with the through hole 180'.

The blocking point control unit 385 may be formed as a plurality along an inner surface of the fracture unit 381. For example, the blocking point control unit 385 may be formed as a pair on both side surfaces of the fracture unit 381 facing the through hole 180'.

Figure 10:
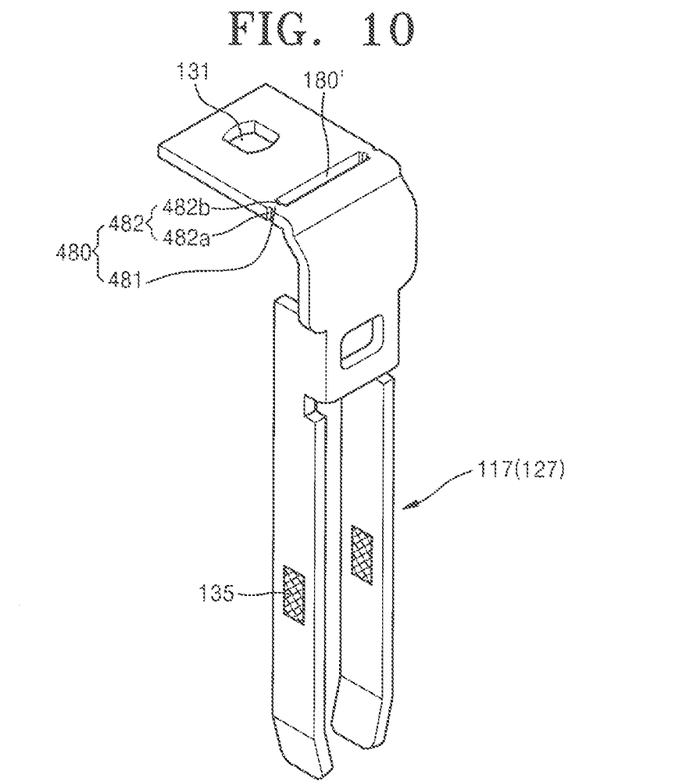
FIG. 10 is a perspective view of a fuse unit that is applied to the secondary battery according to another embodiment of the present invention.
Figure 11:
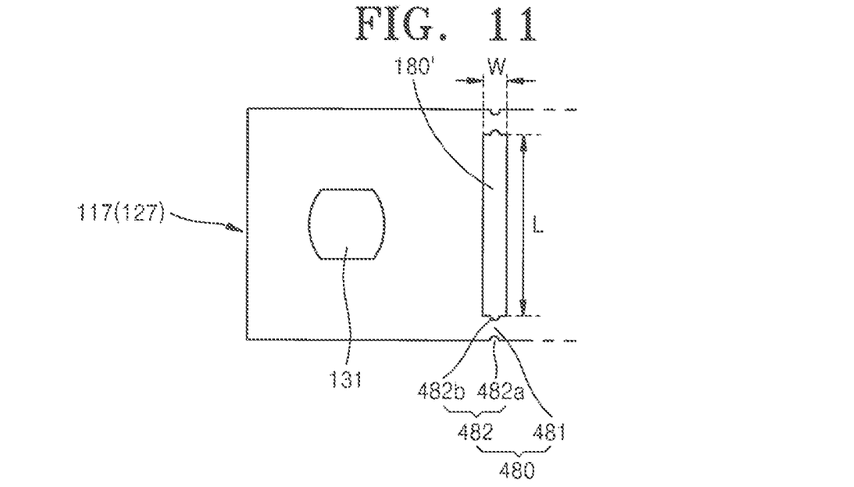
FIG. 11 is a plan view of a planar structure of the fuse unit of FIG. 10.

FIG. 10 is a perspective view of a fuse unit 480 that is applied to the secondary battery according to another embodiment of the present invention. FIG. 11 is a plan view of a planar structure of the fuse unit 480 of FIG. 10.

Referring to FIGS. 10 and 11, the fuse unit 480 may include a fracture unit 481 formed around the through hole 180' and a blocking point control unit 482 formed on the fracture unit 481. The fracture unit 481 may be formed to surround the through hole 180' formed in the current collecting member 117 (127), and an area of the fracture unit 481 may be controlled by the size of the through hole 180'. The blocking point control unit 482 is formed on the fracture unit 481, and may include first and second control units 482a and 482b that are formed on different locations.

More specifically, the first control unit 482a may be formed on an external surface of the fracture unit 481, and the second control unit 482b may be formed on an inner surface of the fracture unit 481, that is, the inner surface facing the through hole 180'. For example, the first and second control units 482a and 482b respectively may be formed in a notch shape on the inner and external surfaces of the fracture unit 481. The first and second control units 482a and 482b may induce a fracture of the current collecting member 117 (127) in a length direction of the through hole 180' by forming the first and second control units 482a and 482b in a region W of the fracture unit 481 that is projected in a length direction of the through hole 180'.

The first and second control units 482a and 482b may precisely control the blocking point by cooperating with each other. Since the fracture unit 481 is formed through a relatively large through hole 180', the fracture unit 481 may not be suitable for precisely controlling the blocking point, and also, when the through hole 180' is enlarged, the strength of the current collecting member 117 (127) may be reduced. In this embodiment, the blocking point may be precisely controlled through the first and second control units 482a and 482b having a minute size and the strength of the current collecting member 117 (127) may be maintained.

Figure 12:
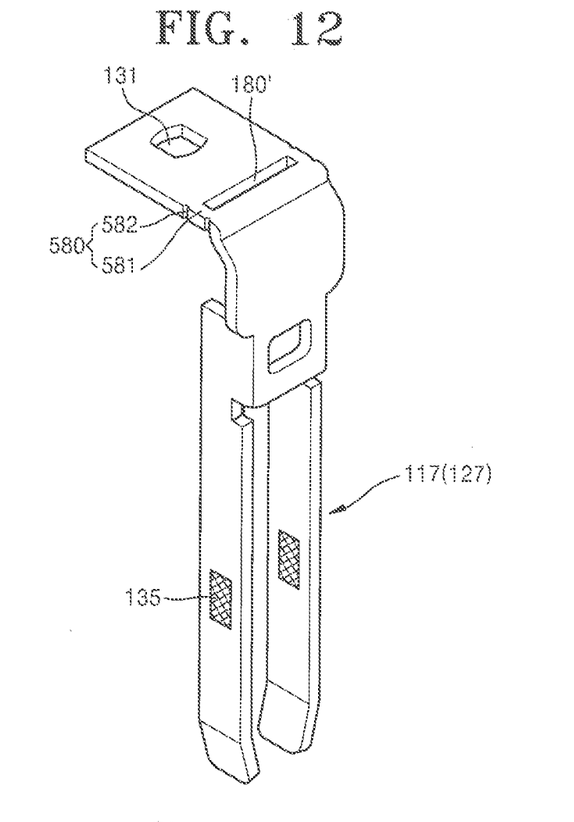
FIG. 12 is a perspective view of a fuse unit that is applied to the secondary battery according to another embodiment of the present invention.
Figure 13:
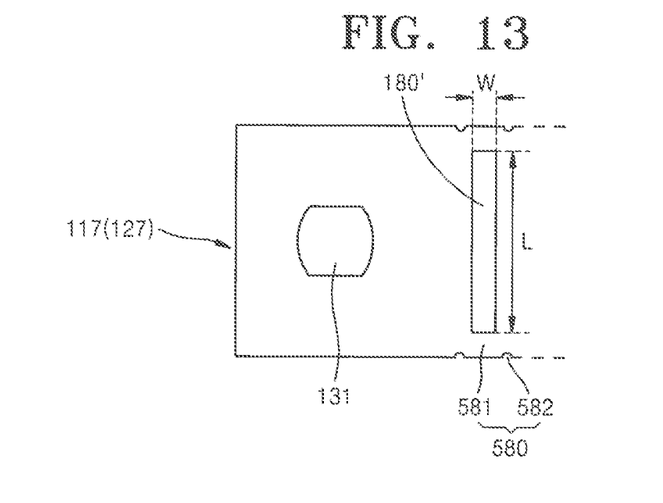
FIG. 13 is a plan view of a planar structure of the fuse unit of FIG. 12.

FIG. 12 is a perspective view of a fuse unit 580 that is applied to the secondary battery according to another embodiment of the present invention. FIG. 13 is a plan view of a planar structure of the fuse unit 580 of FIG. 12.

Referring to FIGS. 12 and 13, the fuse unit 580 may include a fracture unit 581 formed around a through hole 180' and a blocking point control unit 582 formed on the fracture unit 581. The fracture unit 581 may be formed in a shape surrounding the through hole 180' formed in the current collecting member 117 (127). The blocking point control unit 582 may be formed on an external surface of the fracture unit 581. In particular, in the current embodiment, the blocking point control unit 582 may be formed outside the region W of the fracture unit 581 that is projected in a length direction of the through hole 180'.

The blocking point control unit 582 does not control a passing area of a charging and discharging current at the same cross-sectional surface as the through hole 180'. However, since the blocking point control unit 582 is formed in a notch shape, the blocking point control unit 582 provides a discontinuous point to a flow of the charging and discharging current. As a bottleneck phenomenon of the blocking point control unit 185, the charging and discharging current is concentrated on the blocking point control unit 582, and thus, an initiation point for thermal melting is provided. In this point of view, the blocking point control unit 582 may provide an environment for blocking the charging and discharging current at the designed blocking point.

The blocking point control unit 582 may be located as a plurality along an external surface of the fracture unit 581. For example, as depicted in FIG. 13, the blocking point control unit 582 may be formed in pairs on different surfaces of the fracture unit 581, or may be arranged adjacent to each other of the same surface of the fracture unit 581.

Figure 14:
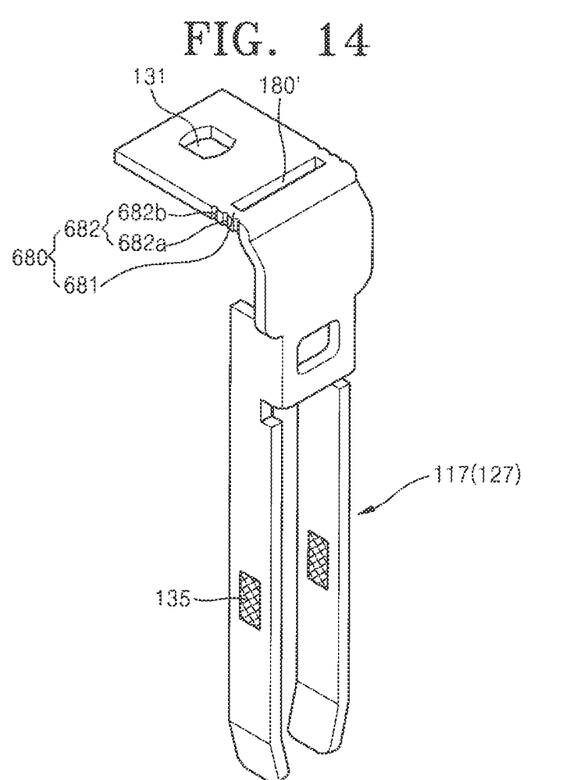
FIG. 14 is a perspective view of a fuse unit that is applied to the secondary battery according to another embodiment of the present invention.
Figure 15:
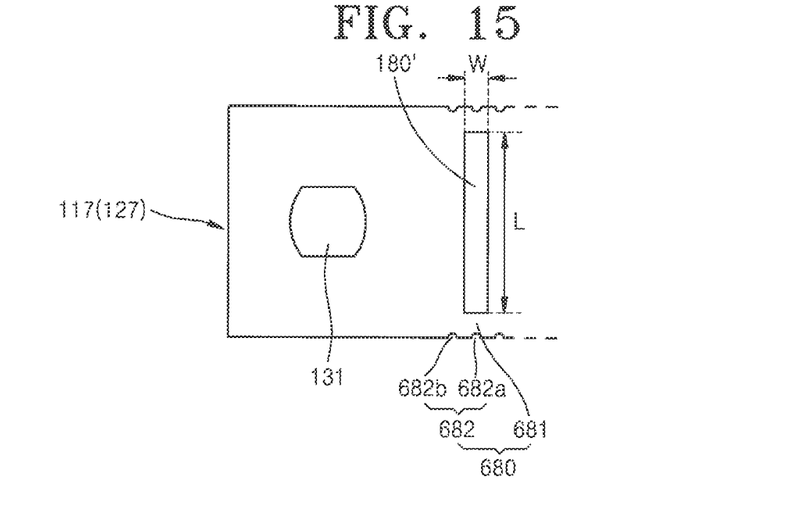
FIG. 15 is a plan view of a planar structure of the fuse unit of FIG. 14.

FIG. 14 is a perspective view of a fuse unit 680 that is applied to the secondary battery according to another embodiment of the present invention. FIG. 15 is a plan view of a planar structure of the fuse unit 680 of FIG. 14.

Referring to FIGS. 14 and 15, the fuse unit 680 may include a fracture unit 681 formed around the through hole 180' and a blocking point control unit 682 formed on the fracture unit 681. The fracture unit 681 may be formed to surround the through hole 180' formed in the current collecting member 117 (127). The blocking point control unit 682 may be formed on the fracture unit 681, and may be formed on an external surface of the fracture unit 581 opposite to the through hole 180'. In this embodiment, the blocking point control unit 682 may be formed as a plurality along an external surface of the fracture unit 581 and may include first and second control units 682a and 682b. The first control unit 682a is formed in a projected region W that is formed along a length direction of the through hole 180', and may induce a fracture of the current collecting member 117 (127) in the length direction of the through hole 180'. Also, the second control unit 682b is formed outside the region W of the fracture unit 681 that is projected in a length direction of the through hole 180. Therefore, the second control unit 682b may induce a bottleneck of a charging and discharging current, and thus, may provide an initiation point for thermal melting.

Figure 16:
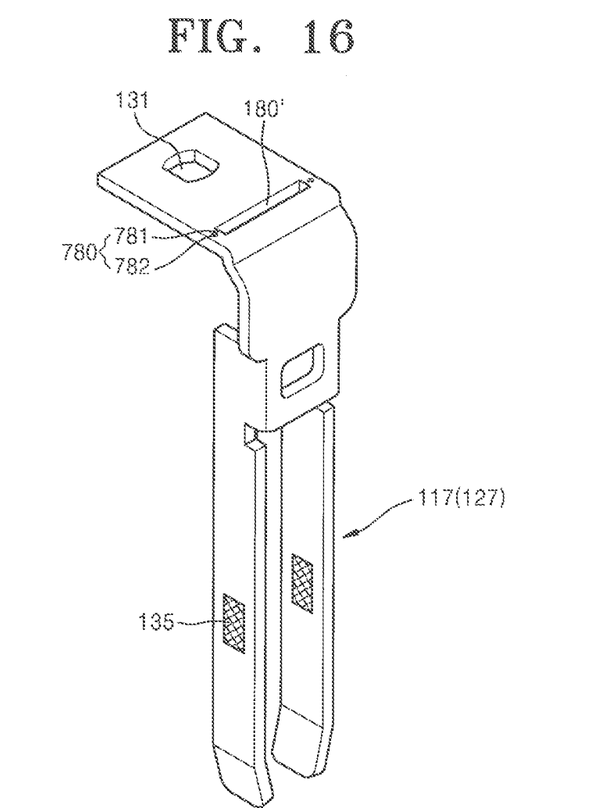
FIG. 16 is a perspective view of a fuse unit that is applied to the secondary battery according to another embodiment of the present invention.
Figure 17:
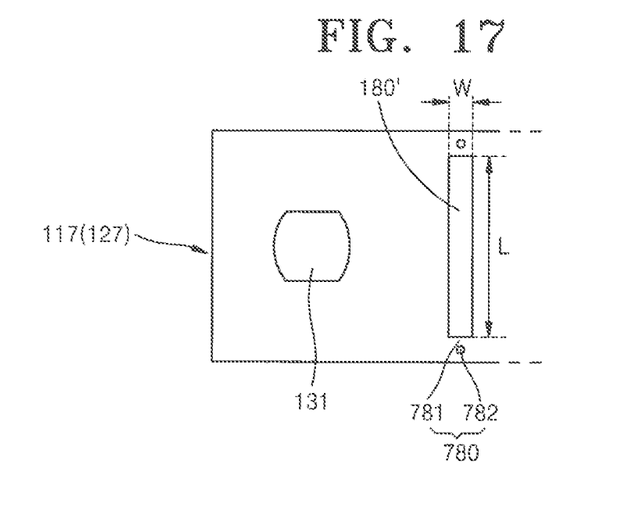
FIG. 17 is a plan view of a planar structure of the fuse unit of FIG. 16.

FIG. 16 is a perspective view of a fuse unit 780 that is applied to the secondary battery according to another embodiment of the present invention. FIG. 17 is a plan view of a planar structure of the fuse unit 780 of FIG. 16.

Referring to FIGS. 16 and 17, the fuse unit 780 may include a fracture unit 781 formed around the through hole 180' and a blocking point control unit 782 formed on the fracture unit 781. The fracture unit 781 may be formed to surround the through hole 180' formed in the current collecting member 117 (127). The blocking point control unit 782 may be formed in the fracture unit 781 as a through hole.

For example, the blocking point control unit 782 may be formed as a hole in a location separated from the through hole 180', and may be formed in a size relatively minute compared to that of the through hole 180'. The blocking point control unit 782 may be formed on a side of the through hole 180' or may be formed as a pair on opposite sides of the through hole 180'. The blocking point control unit 782 may be formed in a region W of the fracture unit 781 that is projected in a length direction of the through hole 180', and may induce a fracture in the length direction of the through hole 180'.

Hereinafter, the configuration of constituent elements of the secondary battery will be described in detail with reference to FIG. 3. Referring to FIG. 3, the current collecting members 117 and 127 electrically connected to the electrode assembly 150 are connected to the first and second terminal plates 111 and 121 disposed on the cap plate 100 through the first and second current collecting terminals 115 and 125.

The first and second current collecting terminals 115 and 125 may include first and second current collecting terminal fixing units 115a and 125a and first and second current collecting terminal flange units 115b and 125b, which are respectively formed in an upper and lower portion of the first and second current collecting terminals 115 and 125 along a length direction of the first and second current collecting terminals 115 and 125. For example, the first and second current collecting terminals 115 and 125 may be assembled through the cap plate 100, and may include the first and second current collecting terminal fixing units 115a and 125a exposed upwards from the cap plate 100 and the first and second current collecting terminal flange units 115b and 125b disposed on a lower side of the cap plate 100.

The first and second current collecting terminal fixing units 115a and 125a formed for fixing the first and second current collecting terminals 115 and 125 may be fixed, for example, by using a riveting method with respect to upper surfaces of the first and second terminal plates 111 and 121. For example, the first and second current collecting terminal fixing units 115a and 125a form flange units that widely extend in lateral directions from the main bodies of the first and second current collecting terminals 115 and 125, and may be fixed on upper surfaces of the first and second terminal plates 111 and 121. Grooves concavely dug according to a pressure applied by a processing tool that rotates at a high speed may be formed in upper ends of the first and second current collecting terminal fixing units 115a and 125a. According to the pressure applied by the processing tool, the upper ends of the first and second current collecting terminal fixing units 115a and 125a are pushed in the lateral direction, and thus, the first and second current collecting terminal fixing units 115a and 125a may tightly contact with respect to the upper surfaces of the first and second terminal plates 111 and 121.

The first and second current collecting terminal flange units 115b and 125b may have a flange shape extending outwards greater than the terminal holes 100' so that the first and second current collecting terminals 115 and 125 will not disengage through the terminal holes 100' of the cap plate 100. In one embodiment, the first and second current collecting terminals 115 and 125 are assembled in the terminal holes 100' by inserting them into the terminal holes 100' from the lower side of the cap plate 100. Also, the positions of the first and second current collecting terminals 115 and 125 may be fixed by riveting the first and second current collecting terminal fixing units 115a and 125a that are exposed upwards from the cap plate 100 in a state that the first and second current collecting terminals 115 and 125 are supported on a lower side of the cap plate 100 by the first and second current collecting terminal flange units 115b and 125b.

The first and second current collecting terminals 115 and 125 may be inserted into the terminal holes 100' of the cap plate 100 such that they are electrically insulated from the cap plate 100. For example, the seal gaskets 113 and 123 may be inserted into the terminal holes 100', and since the first and second current collecting terminals 115 and 125 are inserted into the terminal holes 100' by locating the seal gaskets 113 and 123 therein, the first and second current collecting terminals 115 and 125 may be insulated from the cap plate 100.

Lower insulating members 114 and 124 may be located between the first and second current collecting terminals 115 and 125 and the cap plate 100, and the lower insulating members 114 and 124 may insulate the first and second current collecting terminals 115 and 125 from the cap plate 100. Accordingly, the seal gaskets 113 and 123 are located around the terminal holes 100' through which the first and second current collecting terminals 115 and 125 pass and the lower insulating members 114 and 124 are located between the first and second current collecting terminals 115 and 125 and the cap plate 100, and thus, the first and second current collecting terminals 115 and 125 may be insulated from the cap plate 100. The formation of the lower insulating members 114 and 124 may extend between the current collecting members 117 and 127 and the cap plate 100.

The first and second terminal plates 111 and 121 may be formed on the cap plate 100. The first and second terminal plates 111 and 121 are electrically connected to the first and second current collecting terminals 115 and 125 and may provide terminal regions greater than that of the first and second current collecting terminals 115 and 125. The first and second terminal plates 111 and 121 may be connected to the first and second current collecting terminals 115 and 125 by a riveting process, but the present invention is not limited thereto. For example, the first and second terminal plates 111 and 121 may be connected to the first and second current collecting terminals 115 and 125 in various combining ways such as welding or a screw combination.

Upper insulating members 112 and 122 may be located between the first and second terminal plates 111 and 121 and the cap plate 100. The upper insulating members 112 and 122 may insulate the first and second terminal plates 111 and 121 from the cap plate 100. According to an embodiment of the present invention, when the first and second terminal plates 111 and 121 and the cap plate 100 have the same polarities, the upper insulating members 112 and 122 may be omitted.

According to the present invention, a safety accident of a secondary battery, such as an explosion or ignition of fire due to an overcurrent, may be prevented by performing a safety operation that forcedly blocks a charging and discharging current path in a circumstance when an overcurrent greater than a preset blocking point flows. In particular, according to the present invention, the current blocking at a preset blocking point may be ensured with high reliability, and a point at which the current path is blocked may be precisely controlled. Also, the reduction of structural strength of the secondary battery due to the safety structure may be minimized.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A secondary battery comprising:
   an electrode assembly;
   a cap plate and a case accommodating the electrode assembly;
   an electrode terminal protruding above the cap plate;
   a current collecting member that electrically connects the electrode assembly to the electrode terminal; and
   a fuse unit on the current collecting member and configured to block a current beyond a preset blocking point, wherein the fuse unit comprises:
   a fracture unit surrounding a through hole in the current collecting member; and
   a blocking point control unit formed as a plurality of notches on the fracture unit, wherein the blocking point control unit is on an inner surface of the fracture unit defining the through hole.

2. The secondary battery of claim 1, wherein the through hole is elongate and extends in a direction substantially perpendicular to the extending direction of the current collecting member.

3. The secondary battery of claim 1, wherein the blocking point control unit is on an external surface of the fracture unit that is on an opposite side to the through hole.

4. The secondary battery of claim 3, wherein the blocking point control unit is formed in a region of an external surface of the fracture unit that is projected in a length direction of the through hole.

5. The secondary battery of claim 3, wherein the blocking point control unit is formed in a concave shape from the external surface of the fracture unit towards the through hole.

6. The secondary battery of claim 3, wherein the blocking point control unit is formed in a pair on both side surfaces of the fracture unit that are opposite to each other with the through hole therebetween.

7. The secondary battery of claim 3, wherein the blocking point control unit is formed on a region of the external surface of the fracture unit outside a width of the through hole.

8. The secondary battery of claim 1, wherein the blocking point control unit forms a single opening together with the through hole by being connected to the through hole.

9. The secondary battery of claim 1, wherein the blocking point control unit is formed in a pair, with one of the pair respectively on either side surface of the fracture unit facing the through hole.

10. The secondary battery of claim 1, wherein the blocking point control unit is within a region of an inner surface of the fracture unit that is projected in a length direction of the through hole.

11. The secondary battery of claim 1, wherein the blocking point control unit comprises a first control unit on an external surface of the fracture unit that is opposite to the through hole and a second control unit on an inner surface of the fracture unit facing the through hole.

12. The secondary battery of claim 11, wherein the first and second control units are within a region of the fracture unit that is projected in a length direction of the through hole.

13. The secondary battery of claim 1, wherein a first portion of the blocking point control unit is in a region of the fracture unit that is within a width of the through hole, and a second portion of the blocking point control unit outside the width of the through hole.

14. A secondary battery comprising:
   an electrode assembly;
   a cap plate and a case accommodating the electrode assembly;
   an electrode terminal protruding above the cap plate;
   a current collecting member that electrically connects the electrode assembly to the electrode terminal; and a fuse unit that is formed on the current collecting member to block a current beyond a preset blocking point, wherein the fuse unit comprises:
a fracture unit surrounding a through hole in the current collecting member; and
a blocking point control unit formed as an opening on the fracture unit, wherein the blocking point control unit is spaced from the through hole and from each perimeter edge of the current collecting member.

15. The secondary battery of claim 14, wherein the through hole is elongate and extends in a direction substantially perpendicular to an extending direction of the current collecting member.

16. The secondary battery of claim 14, wherein the blocking point control unit is separate from the through hole.

17. The secondary battery of claim 14, wherein the blocking point control unit is formed within a width of the fracture unit.

18. The secondary battery of claim 14, wherein the blocking point control unit is formed in a pair with one of the pair respectively on either side of the fracture unit that are opposite to each other with the through hole therebetween.

\* \* \* \* \*